(12) United States Patent
Al-Qasim et al.

(10) Patent No.: US 11,359,134 B2
(45) Date of Patent: Jun. 14, 2022

(54) TREATMENT FLUIDS AND METHODS FOR RECOVERING HYDROCARBONS FROM A SUBTERRANEAN FORMATION

(71) Applicant: Saudi Arabian Oil Company, Dhahran (SA)

(72) Inventors: Abdulaziz S. Al-Qasim, Damman (SA); Afnan Mashat, Dhahran (SA); Zuhair AlYousif, Saihat (SA); Deena Tayyib, Dhahran (SA); Mustafa Alsaffar, Qatif (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/073,741

(22) Filed: Oct. 19, 2020

(65) Prior Publication Data
US 2022/0119700 A1 Apr. 21, 2022

(51) Int. Cl.
*C09K 8/584* (2006.01)
*E21B 43/16* (2006.01)

(52) U.S. Cl.
CPC .............. *C09K 8/584* (2013.01); *E21B 43/16* (2013.01)

(58) Field of Classification Search
CPC ....................................................... C09K 8/60
See application file for complete search history.

(56) References Cited

U.S. PATENT DOCUMENTS

| | | | |
|---|---|---|---|
| 4,525,287 A | 6/1985 | Carstensen | |
| 4,873,008 A | 10/1989 | Landis et al. | |
| 4,954,242 A | 9/1990 | Gruia | |
| 4,961,839 A | 10/1990 | Stine et al. | |
| 5,120,427 A | 6/1992 | Stine et al. | |
| 5,139,644 A | 8/1992 | Gruia | |
| 5,139,646 A | 8/1992 | Gruia | |
| 5,296,132 A | 3/1994 | Hart | |
| 5,389,299 A | 2/1995 | Hart | |
| 6,624,124 B2 | 9/2003 | Garmier | |
| 6,806,235 B1 | 10/2004 | Mueller et al. | |
| 7,373,977 B1 | 5/2008 | Berger et al. | |
| 8,343,334 B2 | 1/2013 | Koseoglu | |
| 8,403,051 B2 | 3/2013 | Huang et al. | |
| 8,828,219 B2 | 9/2014 | Koseoglu | |
| 8,877,040 B2 | 11/2014 | Hoehn et al. | |
| 9,023,192 B2 | 5/2015 | Koseoglu | |
| 9,388,347 B2 | 7/2016 | Ramaseshan et al. | |
| 9,394,493 B2 | 7/2016 | Koseoglu | |
| 9,534,179 B2 | 1/2017 | Koseoglu | |
| 9,580,663 B2 | 2/2017 | Low et al. | |
| 9,663,732 B2 | 5/2017 | Ganyu | |
| 9,701,712 B2 | 7/2017 | Karim et al. | |
| 9,783,748 B2 | 10/2017 | Harvey et al. | |
| 9,914,889 B2 | 3/2018 | Hoehn et al. | |
| 9,944,863 B2 | 4/2018 | Zhang et al. | |
| 10,011,786 B1 | 7/2018 | Eizenga et al. | |
| 10,053,619 B2 | 8/2018 | Saboowala et al. | |
| 10,301,560 B2 | 5/2019 | Wang et al. | |
| 10,435,635 B2 | 10/2019 | Hoehn et al. | |
| 10,533,142 B2 | 1/2020 | Sauge et al. | |
| 2004/0127581 A1 | 7/2004 | Baran, Jr. et al. | |
| 2005/0202097 A1 | 9/2005 | Maskin | |
| 2007/0042913 A1 | 2/2007 | Hutchins et al. | |
| 2007/0287636 A1* | 12/2007 | Heller | C09K 8/34 507/116 |
| 2008/0161207 A1 | 7/2008 | Welton et al. | |
| 2011/0071060 A1 | 3/2011 | Nguyen | |
| 2013/0109879 A1 | 5/2013 | Berger et al. | |
| 2015/0159071 A1 | 6/2015 | Massey et al. | |
| 2017/0121585 A1* | 5/2017 | Hossain | C09K 8/36 |
| 2017/0137689 A1 | 5/2017 | Deroo | |
| 2017/0198201 A1 | 7/2017 | Chang | |
| 2018/0057732 A1 | 3/2018 | Babcock | |
| 2018/0223167 A1 | 8/2018 | AlBahrani et al. | |
| 2018/0223175 A1* | 8/2018 | Al-Yami | E21B 33/14 |
| 2018/0346798 A1 | 12/2018 | Abdel-Fattah et al. | |

(Continued)

FOREIGN PATENT DOCUMENTS

| | | |
|---|---|---|
| EP | 308651 A2 | 3/1989 |
| EP | 0770661 A1 | 5/1997 |

(Continued)

OTHER PUBLICATIONS

U.S. Office Action dated Sep. 13, 2021 pertaining to U.S. Appl. No. 16/922,088, filed Jul. 7, 2020, 48 pages.
International Search Report and Written Opinion dated Jan. 21, 2021 pertaining to International application No. PCT/US2020/053253 filed Sep. 29, 2020, 18 pgs.
Youssif, Ahmed A A et al. "Production of Bio Lubricant from Jojoba Oil Synthesis and Characteristic of Carboxymethyl Cellulose from Baobab (*Adansonia digitata* L.) Fruit Shell View project", International Journal of Engineering Innovation & Research vol. 8, Issue 4, ISSN: 2277-5668, Jul. 17, 2019, pp. 146-153.
Abobatta, Waleed F. "*Simmondsia chinensis* Jojoba tree", Journal of Advanced Trends in Basic and Applied Science, vol. 1, No. 1: 160-165, 2017.
Andersson et al., "First-Principles Prediction of Liquid/Liquid Interfacial Tension", Journal of Chemical Theory and Computation, vol. 10, pp. 3401-3408, May 28, 2014.

(Continued)

*Primary Examiner* — William D Hutton, Jr.
*Assistant Examiner* — Avi T Skaist
(74) *Attorney, Agent, or Firm* — Dinsmore & Shohl LLP

(57) ABSTRACT

Treatment fluids of the present disclosure may comprise an aqueous base fluid and a surfactant composition. The surfactant composition may comprise a sulfonate surfactant in an amount of from 0.01 wt. % to 2 wt. % based on the total weight of the treatment fluid composition, a plant-based oil in an amount of from 0.01 wt. % to 2 wt. % based on the total weight of the treatment fluid composition, and a zwitterionic co-surfactant in an amount of from 0.01 wt. % to 2 wt. % based on the total weight of the treatment fluid composition. The plant-based oil may comprise from 65 mol. % to 85 mol. % species comprising one or more gondoic acid moieties. Methods for recovering hydrocarbons from a subterranean formation with the treatment fluid are also disclosed.

18 Claims, No Drawings

(56) References Cited

U.S. PATENT DOCUMENTS

| | | |
|---|---|---|
| 2019/0048287 A1 | 2/2019 | Long et al. |
| 2019/0055459 A1* | 2/2019 | Zelenev ................. C09K 8/035 |

FOREIGN PATENT DOCUMENTS

| | | |
|---|---|---|
| JP | 4567445 B2 | 10/2010 |
| RU | 2623380 C1 | 6/2017 |
| WO | 2004053016 A1 | 6/2004 |
| WO | 2004101955 A1 | 11/2004 |
| WO | 2010065634 A2 | 6/2010 |
| WO | 2015135777 A2 | 9/2015 |
| WO | 2016138072 A1 | 9/2016 |
| WO | 2018005341 A1 | 1/2018 |
| WO | 2018081063 A1 | 5/2018 |
| WO | 2018144277 A1 | 8/2018 |
| WO | 2019175649 A1 | 9/2019 |
| WO | 2021091631 A1 | 5/2021 |

OTHER PUBLICATIONS

Rudyk et al., "Supercritical carbon dioxide extraction of oil sand enhanced by water and alcohols as Co-solvents", Journal of CO2 Utilization, vol. 17, pp. 90-98, 2017.

Veronina et al., "Physical foaming of fluorinated ethylene-propylene (FEP) copolymers in supercritical carbon dioxide: single-film fluoropolymer piezoelectrets", Applied Physics A, vol. 90, pp. 615-618, 2008.

Zhang et al., "Dissolution of surfactants in supercritical CO2 with co-solvents", Chemical Engineering Research and Design, vol. 94, pp. 624-631, 2015.

Office Action dated Nov. 24, 2020 pertaining to U.S. Appl. No. 16/672,967, filed Nov. 4, 2019, 11 pgs.

Office Action dated Aug. 18, 2020 pertaining to U.S. Appl. No. 16/672,967, filed Nov. 4, 2019, 8 pgs.

Busson-Breysse, "Jojoba was: Its esters and some of its minor components", Journal of the American Oil Chemists' Society, vol. 71, No. 9, pp. 999-1002, Sep. 1994.

U.S. Office Action dated Jul. 20, 2021 pertaining to U.S. Appl. No. 16/672,967, filed Nov. 4, 2019, 10 pages.

Dubois, V. et al., "Fatty acid profiles of 80 vegetable oils with regard to their nutritional potential", Eur. J. Lipid Sci. Technol. 109 (2007), pp. 710-732 (Year: 2007).

Product data sheets of linolenic acid by Sigma-Aldrich (Year: 2020).

Product data sheets of linoleic acid by Millipore-Sigma (Year: 2020).

International Search Report and Written Opinion dated Apr. 1, 2021 pertaining to International application No. PCT/US2020/066302 filed Dec. 21, 2020, 14 pgs.

U.S. Notice of Allowance and Fee(s) Due dated Nov. 15, 2021 pertaining to U.S. Appl. No. 16/672,967, filed Nov. 4, 2019, 10 pages.

U.S. Office Action dated Feb. 3, 2022 pertaining to U.S. Appl. No. 17/183,802, filed Feb. 24, 2021, 24 pages.

International Search Report and Written Opinion dated Jan. 27, 2022 pertaining to International application No. PCT/US2021/052769 filed Sep. 30, 2021, 15 pages.

International Search Report and Written Opinion dated Feb. 28, 2022 pertaining to International application No. PCT/US2021/054360 filed Oct. 11, 2021, 14 pages.

U.S. Office Action dated Mar. 15, 2022 pertaining to U.S. Appl. No. 16/922,088, filed Jul. 7, 2020, 34 pages.

* cited by examiner

TREATMENT FLUIDS AND METHODS FOR RECOVERING HYDROCARBONS FROM A SUBTERRANEAN FORMATION

BACKGROUND

Field

The present disclosure relates to natural resource recovery from subterranean formations and, more specifically, to treatment fluids used in the recovery of hydrocarbons from subterranean formations.

Technical Background

The discovery and extraction of hydrocarbons, such as oil or natural gas, from subterranean formations may be impeded for a variety of reasons, such as inherently poor permeability or formation damage. As a result, the production rate of hydrocarbons from a hydrocarbon-producing region of a subterranean formation may be significantly reduced compared to the expected production rate. In these instances, methods for enhancing recovery from the hydrocarbon-producing regions of the subterranean formation can be utilized to improve hydrocarbon production. For example, some methods for enhancing oil recovery from hydrocarbon-producing regions of subterranean formations may include the injection of treatment materials into a subterranean formation to decrease the mobility ratio (that is, the ratio of the displacing phase mobility to the displaced phase mobility) by reducing the interfacial tension between hydrocarbons in the subterranean formation and an external fluid, such as water injected into the subterranean formation during secondary recovery, improving the wettability of the rock of the subterranean formation, or both. However, conventional enhanced oil recovery typically requires significant amounts of surfactants in order to deliver a suitable amount to the interface between external fluids and hydrocarbons, particularly in regions distant from the wellbore. This is due, at least in part, to the significant amounts of surfactants that are adsorbed onto surfaces of the rock of the subterranean formation. While this adsorption may be overcome by increasing the concentration of surfactants or including an additional additive, these methods often increase the cost of enhanced oil recovery and still fail to maintain a constant concentration of surfactants at the interface between external fluids and hydrocarbons. Moreover, these surfactants tend to become ineffective at elevated temperatures (that is, from 75 degrees Celsius (° C.) to 150° C.) and elevated salinities, which are common in subterranean formations. In particular, the solubility of conventional surfactants tends to decrease as the temperature, the salinity, or both, of the external fluid increases, causing the surfactants to precipitate.

SUMMARY

Accordingly, there is an ongoing need for treatment fluids and methods for recovering hydrocarbons from subterranean formations. The treatment fluids of the present disclosure may generally comprise an aqueous base fluid and a surfactant composition. The surfactant composition of the treatment fluid may reduce the interfacial tension between the aqueous base fluid of the treatment fluid and hydrocarbons, increasing the mobility of the hydrocarbons and promoting their displacement from subterranean formations. Furthermore, this increased hydrocarbon yield may be achieved with reduced amounts of surfactant compared to conventional treatment fluids. Without being bound by any particular theory, it is believed the surfactant composition, in one or more embodiments, may form an emulsion of droplets having a diameter of from 10 nanometers (nm) to 100 nm (sometimes referred to in the present disclosure as "Nanodroplets") dispersed throughout the aqueous base fluid, which enable the surfactant composition to migrate significant distances through a subterranean formation without significant adsorption onto surfaces of the rock of the subterranean formation. Moreover, the surfactant composition has displayed prolonged stability with minimal precipitation at elevated temperatures and salinities.

According to one or more embodiments of the present disclosure, a treatment fluid may comprise an aqueous base fluid and a surfactant composition. The surfactant composition may comprise a sulfonate surfactant in an amount of from 0.01 weight percent (wt. %) to 2 wt. % based on the total weight of the treatment fluid composition, a plant-based oil in an amount of from 0.01 wt. % to 2 wt. % based on the total weight of the treatment fluid composition, and a zwitterionic co-surfactant in an amount of from 0.01 wt. % to 2 wt. % based on the total weight of the treatment fluid composition. The plant-based oil may comprise from 65 mole percent (mol. %) to 85 mol. % species comprising one or more gondoic acid moieties.

According to one or more additional embodiments of the present disclosure, a method for recovering hydrocarbons from a subterranean formation may comprise introducing a treatment fluid into an injection well in fluid communication with the subterranean formation and driving the treatment fluid through the subterranean formation such that the hydrocarbons are displaced from the subterranean formation to a production well in fluid communication with the subterranean formation. The treatment fluid may comprise an aqueous base fluid and a surfactant composition. The surfactant composition may comprise a sulfonate surfactant in an amount of from 0.01 wt. % to 2 wt. % based on the total weight of the treatment fluid composition, a plant-based oil in an amount of from 0.01 wt. % to 2 wt. % based on the total weight of the treatment fluid composition, and a zwitterionic co-surfactant in an amount of from 0.01 wt. % to 2 wt. % based on the total weight of the treatment fluid composition. The plant-based oil may comprise from 65 mol. % to 85 mol. % species comprising one or more gondoic acid moieties.

Additional features and advantages of the present disclosure will be set forth in the detailed description that follows and, in part, will be readily apparent to those skilled in the art from the description or recognized by practicing the technology as described in this disclosure, including the detailed description that follows, as well as the claims.

DETAILED DESCRIPTION

The present disclosure is directed to treatment fluids used in the recovery of hydrocarbons from subterranean formations. A subterranean formation is the fundamental unit of lithostratigraphy. As used in the present disclosure, the term "subterranean formation" refers to a body of rock that is sufficiently distinct from the surrounding rock bodies such that the body of rock can be mapped as a distinct entity. A subterranean formation may be, therefore, sufficiently homogenous to form a single identifiable unit containing similar geological properties throughout the subterranean formation, including, but not limited to, porosity and permeability. A single subterranean formation may include different regions, where some regions include hydrocarbons and others do not. To produce hydrocarbons from the hydrocarbon-bearing regions of the subterranean formation, production wells are drilled to a depth that enables these hydrocarbons to travel from the subterranean formation to the surface. This initial stage of production is referred to as "primary recovery."

In primary recovery, natural formation energy, such as gasdrive, waterdrive, or gravity drainage, displaces hydrocarbons from the subterranean formation into the wellbore and up to the surface. As used in the present disclosure, the term "wellbore" refers to the drilled hole or borehole, including the openhole or uncased portion, of a well. Initially, the formation pressure may be considerably greater than the downhole pressure inside the wellbore. This differential pressure may drive hydrocarbons toward the wellbore and up to the surface. However, as the formation pressure decreases due to hydrocarbon production, the differential pressure also decreases. The primary recovery stage reaches its limit when the formation pressure is reduced to the point that the hydrocarbon production rates are no longer economical or when the proportions of gas or water in the production stream increase to the point that further primary recovery is no longer economical. During primary recovery, only a minority percentage of the total initial hydrocarbons in the subterranean formation are extracted (typically around 10 percent (%) by volume for subterranean formations).

During a second recovery stage of hydrocarbon production, an external fluid, such as water or gas, may be injected into the subterranean formation through injection wells positioned in fluid communication with production wells. As used in the present disclosure, the term "injection well" refers to a well in which fluids are injected into the subterranean formation rather than produced from the subterranean formation. Secondary recovery may operate to maintain formation pressure and to displace hydrocarbons toward the wellbore. The secondary recovery stage reaches its limit when the injected fluid (water or gas) is produced from the production well in amounts sufficient such that the production of hydrocarbons is no longer economical. The successive use of primary recovery and secondary recovery in a hydrocarbon-producing subterranean formation produces, on average, 15% to 40% by volume of the original hydrocarbons in place. This indicates that a significant amount of hydrocarbons remains in a subterranean formation after primary and secondary recovery.

Enhanced oil recovery can be used during, or after, primary or secondary recovery to increase the hydrocarbon yield from subterranean formations. As used in the present disclosure, the term "enhanced oil recovery" refers to various supplementary recovery techniques utilized for the purpose of increasing the hydrocarbon yield from subterranean formations. Enhanced oil recovery may include various physical and chemical techniques to alter the original properties of the hydrocarbons, which, as a result, improve hydrocarbon displacement in a subterranean formation and increase fluid flow from the subterranean formation to the production well. For example, during chemical enhanced oil recovery, treatment materials may be injected into a subterranean formation and increase mobility of hydrocarbon in the subterranean formation by reducing the interfacial tension between the hydrocarbons and an external fluid, such as water injected into the subterranean formation during secondary recovery. As used in the present disclosure, the term "interfacial tension" refers to the surface free energy between two immiscible phases. Generally, interfacial tension may be inversely correlated to a dimensionless capillary number ($N_{ca}$), which is defined as a ratio of viscous forces to capillary forces. A greater capillary number generally correlates to increased hydrocarbon yield. Accordingly, the reduction of the interfacial tension between hydrocarbons and external fluids generally results in increased hydrocarbon yield.

Conventional treatment materials for chemical enhanced oil recovery typically comprise one or more surfactants that may adsorb at the interface between external fluids and hydrocarbons, decreasing the interfacial tension between the two phases and facilitating the displacement of the hydrocarbons. However, significant amounts of these surfactants are required in order to deliver a suitable amount to the interface between external fluids and hydrocarbons, particularly in regions distant from the wellbore. This is due, at least in part, to the significant amounts of surfactants that are adsorbed onto surfaces of the rock of the subterranean formation. While this adsorption may be overcome by increasing the concentration of surfactants or including an additional additive, these methods often increase the cost of enhanced oil recovery and still fail to maintain a constant concentration of surfactants at the interface between external fluids and hydrocarbons. Moreover, these surfactants tend to become ineffective at elevated temperatures (that is, from 75 degrees Celsius (° C.) to 150° C.) and elevated salinities, which are common in subterranean formations. In particular, the solubility of conventional surfactants tends to decrease as the temperature, the salinity, or both, of the external fluid increases, causing the surfactants to precipitate.

However, the treatment fluids of the present disclosure may be functional with significantly decreased amounts of surfactant, when compared to conventional treatment fluids, which display prolonged stability despite temperature and salinity. The treatment fluids of the present disclosure may generally comprise an aqueous base fluid and a surfactant composition. The surfactant composition may comprise a sulfonate surfactant in an amount of from 0.01 wt. % to 2 wt. % based on the total weight of the treatment fluid composition, a plant-based oil in an amount of from 0.01 wt. % to 2 wt. % based on the total weight of the treatment fluid composition, and a zwitterionic co-surfactant in an amount of from 0.01 wt. % to 2 wt. % based on the total weight of the treatment fluid composition. The plant-based oil may comprise from 65 mol. % to 85 mol. % species comprising one or more gondoic acid moieties.

The treatment fluids of the present disclosure may increase hydrocarbon yield from subterranean formations. In particular, the surfactant composition of the treatment fluid may reduce the interfacial tension between the aqueous base fluid of the treatment fluid and hydrocarbons, increasing the mobility of the hydrocarbons and promoting their displacement from subterranean formations. Furthermore, this increased hydrocarbon yield may be achieved with reduced amounts of surfactant compared to conventional treatment fluids. Without being bound by any particular theory, it is believed the surfactant composition may form an emulsion of Nano-droplets dispersed throughout the aqueous base fluid, which enable the surfactant composition to migrate significant distances through a subterranean formation without significant adsorption onto surfaces of the rock of the subterranean formation. Moreover, the surfactant composition has displayed prolonged stability with minimal precipitation at elevated temperatures and salinities.

As mentioned previously, the treatment fluids of the present disclosure may comprise an aqueous base fluid. As used in the present disclosure, the term "aqueous" refers to fluids or solutions comprising water as the major constituent. The aqueous base fluid may be generally categorized as fresh water, brackish water, saline water, or brine. That is, the aqueous base fluid may be generally categorized based on salinity. As used in the present disclosure, the term "salinity" refers to the amount of total dissolved solids in the aqueous base fluid. Typical solids comprise salts, such as alkali metal chlorides, hydroxides, carboxylates, or combinations of these. For example, the aqueous base fluid may comprise sodium, calcium, cesium, zinc, aluminum, magnesium, potassium, strontium, silicon, lithium, chlorides, bromides, carbonates, iodides, chlorates, bromates, formates, nitrates, sulfates, phosphates, oxides, fluorides, or combinations of these. Generally, an aqueous base fluid having a total dissolved solids concentration less than 500 parts per million (ppm) may be considered fresh water, an aqueous base fluid having a total dissolved concentration from 500 ppm to 30,000 ppm may be considered brackish water, an aqueous base fluid having a total dissolved concentration from 30,000 ppm to 50,000 ppm may be considered saline water, and an aqueous base fluid having a total dissolved solids concentration greater than 50,000 ppm may be considered brine. Without being bound by any particular theory, it is believed the salinity of the aqueous base fluid may determine the density of the treatment fluid. For example, a treatment fluid comprising brine may generally have a greater density compared to a treatment fluid comprising fresh water.

The treatment fluid of the present disclosure may comprise an aqueous base fluid in an amount of from 90 wt. % to 99 wt. %, based on the total weight of the treatment fluid. For example, the treatment fluid may comprise an aqueous base fluid in an amount of from 90 wt. % to 98 wt. %, from 90 wt. % to 97 wt. %, from 90 wt. % to 96 wt. %, from 90 wt. % to 95 wt. %, from 90 wt. % to 94 wt. %, from 90 wt. % to 93 wt. %, from 90 wt. % to 92 wt. %, from 90 wt. % to 91 wt. %, from 91 wt. % to 99 wt. %, from 91 wt. % to 98 wt. %, from 91 wt. % to 97 wt. %, from 91 wt. % to 96 wt. %, from 91 wt. % to 95 wt. %, from 91 wt. % to 94 wt. %, from 91 wt. % to 93 wt. %, from 91 wt. % to 92 wt. %, from 92 wt. % to 99 wt. %, from 92 wt. % to 98 wt. %, from 92 wt. % to 97 wt. %, from 92 wt. % to 96 wt. %, from 92 wt. % to 95 wt. %, from 92 wt. % to 94 wt. %, from 92 wt. % to 93 wt. %, from 93 wt. % to 99 wt. %, from 93 wt. % to 98 wt. %, from 93 wt. % to 97 wt. %, from 93 wt. % to 96 wt. %, from 93 wt. % to 95 wt. %, from 93 wt. % to 94 wt. %, from 94 wt. % to 99 wt. %, from 94 wt. % to 98 wt. %, from 94 wt. % to 97 wt. %, from 94 wt. % to 96 wt. %, from 94 wt. % to 95 wt. %, from 95 wt. % to 99 wt. %, from 95 wt. % to 98 wt. %, from 95 wt. % to 97 wt. %, from 95 wt. % to 96 wt. %, from 96 wt. % to 99 wt. %, from 96 wt. % to 98 wt. %, from 96 wt. % to 97 wt. %, from 97 wt. % to 99 wt. %, from 97 wt. % to 98 wt. %, or from 98 wt. % to 99 wt. %, based on the total weight of the treatment fluid. When the treatment fluid comprises the aqueous base fluid in an amount less than 90 wt % based on the total weight of the treatment fluid, the stability of the aqueous base fluid may be negatively affected, which may cause the surfactant composition to become ineffective. In contrast, when the treatment fluid comprises the aqueous base fluid in an amount greater than 99 wt. % based on the total weight of the treatment fluid, the treatment fluid may not comprise the surfactant composition in an amount effective to reduce the interfacial tension between the aqueous base fluid and hydrocarbons.

As mentioned previously, the treatment fluids of the present disclosure may comprise a surfactant composition. The surfactant composition may generally comprise a sulfonate surfactant, a plant-based oil, and a zwitterionic co-surfactant. Without being bound by any particular theory, it is believed that the surfactant composition forms an emulsion when mixed with the aqueous base fluid. As used in the present disclosure, the term "emulsion" refers to a mixture comprising at least two immiscible phases: a dispersed phase and a continuous phase. In particular, the surfactant composition forms Nano-droplets that are dispersed throughout the aqueous base fluid. As used in the present disclosure, the term "Nano-droplets" refers to droplets having a diameter of from 10 nanometers (nm) to 100 nm. For example, Nano-droplets may have a diameter of from 10 nm to 85 nm, from 10 nm to 70 nm, from 10 nm to 55 nm, from 10 nm to 40 nm, from 10 nm to 25 nm, from 25 nm to 100 nm, from 25 nm to 85 nm, from 25 nm to 70 nm, from 25 nm to 55 nm, from 25 nm to 40 nm, from 40 nm to 100 nm, from 40 nm to 85 nm, from 40 nm to 70 nm, from 40 nm to 55 nm, from 55 nm to 100 nm, from 55 nm to 85 nm, from 55 nm to 70 nm, from 70 nm to 100 nm, from 70 nm to 85 nm, or from 85 nm to 100 nm.

The Nano-droplets may generally comprise a solution of the sulfonate surfactant and the plant-based oil, which is stabilized within the aqueous base fluid by the zwitterionic co-surfactant. The Nano-droplets may enable more economical and efficient enhanced oil recovery as compared to conventional surfactants due to a reduction of the amount of surfactant lost by adsorption onto the rock surfaces of the subterranean formation. Without being bound by any particular theory, it is believed that, due to the stability of the Nano-droplets, the sulfonate surfactant is only released from the Nano-droplets upon contact with a subterranean hydrocarbon, which reduces adsorption of the sulfonate surfactant onto the rock surfaces of the subterranean formation. Additionally, the size of the Nano-droplets, which is small compared to the average pore sizes of subterranean formations, may facilitate the migration of the Nano-droplets throughout the subterranean formation, increasing sweep efficiency. Moreover, due to the separation of the sulfonate surfactant, the solubility of which decreases as the salinity of the solution increases, from the aqueous base fluid, which may generally comprise saline water or increase in salinity during recovery processes, the surfactant composition will remain stable throughout the recovery process.

As mentioned previously, the surfactant composition of the present disclosure may comprise a sulfonate surfactant. In embodiments, the sulfonate surfactant may comprise a petroleum sulfonate surfactant. As used in the present disclosure, the term "petroleum sulfonate surfactant" refers to a sulfonate surfactant derived from a petroleum feedstock comprising sulfonated benzenoids, cycloaliphatic hydrocarbons, and paraffinic hydrocarbons. The various ratios of each component of a petroleum sulfonate surfactant depends on the composition of the petroleum feedstock. Suitable petroleum sulfonate surfactant may comprise alkyl xylene sulfonates, alkyl aryl sulfonates, alpha-olefin sulfonates, or combinations of these. The sulfonate surfactant may be operable to reduce the interfacial tension between the treatment fluid and subterranean hydrocarbons. In particular, the sulfonate surfactant may adsorb at the interface between the treatment fluid and the subterranean hydrocarbons, decreasing the interfacial tension between the two phases and facilitating the displacement of the subterranean hydrocarbons.

The surfactant composition may comprise the sulfonate surfactant in an amount sufficient to reduce the interfacial tension between the treatment fluid and subterranean hydrocarbons. In embodiments, the surfactant composition may comprise the sulfonate surfactant in an amount sufficient to reduce the interfacial tension between the treatment fluid and subterranean hydrocarbons such that the interfacial tension between the treatment fluid and subterranean hydrocarbons is less than or equal to 0.003 millinewtons per meter (mN/m). For example, the surfactant composition may comprise the sulfonate surfactant in an amount sufficient to reduce the interfacial tension between the treatment fluid and subterranean hydrocarbons such that the interfacial tension between the treatment fluid and subterranean hydrocarbons is from 0.00001 mN/m to 0.003 mN/m, from 0.00001 mN/m to 0.001 mN/m, from 0.00001 mN/m to 0.0001 mN/m, from 0.0001 mN/m to 0.003 mN/m, from 0.0001 mN/m to 0.001 mN/m, or from 0.001 to 0.003 mN/m.

In embodiments, the surfactant composition may comprise the sulfonate surfactant in an amount of from 0.01 wt. % to 2 wt. %, based on the total weight of the treatment fluid. For example, the surfactant composition may comprise a sulfonate surfactant in an amount of from 0.01 wt. % to 1.5 wt. %, from 0.01 wt. % to 1 wt. %, from 0.01 wt. % to 0.5 wt. %, from 0.01 wt. % to 0.1 wt. %, from 0.01 wt. % to 0.05 wt. %, from 0.05 wt. % to 2 wt. %, from 0.05 wt. % to 1.5 wt. %, from 0.05 wt. % to 1 wt. %, from 0.05 wt. % to 0.5 wt. %, from 0.05 wt. % to 0.1 wt. %, from 0.1 wt. % to 2 wt. %, from 0.1 wt. % to 1.5 wt. %, from 0.1 wt. % to 1 wt. %, from 0.1 wt. % to 0.5 wt. %, from 0.5 wt. % to 2 wt. %, from 0.5 wt. % to 1.5 wt. %, from 0.5 wt. % to 1 wt. %, from 1 wt. % to 2 wt. %, from 1 wt. % to 1.5 wt. %, or from 1.5 wt. % to 2 wt. %, based on the total weight of the treatment fluid. When the surfactant composition comprises the sulfonate surfactant in an amount less than 0.01 wt % based on the total weight of the treatment fluid, the surfactant composition may be ineffective in reducing the interfacial tension between the aqueous base fluid and hydrocarbons. Without being bound by any particular theory, it is believed that this may be due to the concentration of the sulfonate surfactant being below the critical micelle concentration, which may prevent the formation of Nano-droplets by the surfactant composition. In contrast, the inclusion of the sulfonate surfactant in an amount significantly greater than the critical micelle concentration (i.e., greater than 2 wt. % based on the total weight of the treatment fluid) may have no appreciable effect on the reduction of the interfacial tension between the aqueous base fluid and hydrocarbons.

As mentioned previously, the surfactant composition may comprise a plant-based oil. In embodiments, the plant-based oil may generally comprise mono-esters of long-chain fatty acids and alcohols, triglycerides of long-chain fatty acids, or combinations of these. As used in the present disclosure, the term "long-chain fatty acid" refers to carboxylic acids that have an aliphatic tail of from 13 carbon atoms to 21 carbon atoms. That is, a long-chain fatty acid is a non-aromatic carboxylic acid that includes a main chain or "backbone" of from 13 carbon atoms to 21 carbon atoms, excluding branched sidechains. For example, palmitic acid ($CH_3(CH_2)_{14}COOH$) is a fatty acid that has an aliphatic tail of 16 carbon atoms and stearic acid ($CH_3(CH_2)_{16}COOH$) is a fatty acid that has an aliphatic tail of 18 carbon atoms. Long-chain fatty acids may have an aliphatic tail that is saturated or unsaturated, straight chain (unbranched) or branched, unsubstituted or heteroatom-substituted, or combinations of these. As presently described, the plant-based oil may comprise a substantial majority, or all, of the fatty acids in the surfactant composition, the treatment fluid, or both, into which the plant-based oil may be incorporated. For example, the plant-based oil may comprise greater than or equal to 90%, greater than or equal to 95%, greater than or equal to 99% or greater than or equal to 99.9% of the fatty acids in the surfactant composition, the treatment fluid, or both, into which the plant-based oil may be incorporated.

In embodiments, the plant-based oil may comprise mono-esters of gondoic acid and alcohols, triglycerides of gondoic acid, or combinations of these. Accordingly, the plant-based oil may comprise from 65 mol. % to 85 mol. % species comprising one or more gondoic acid moieties. For example, the plant-based oil may comprise from 65 mol. % to 80 mol. %, from 65 mol. % to 75 mol. %, from 65 mol. % to 70 mol. %, from 70 mol. % to 85 mol. %, from 70 mol. % to 80 mol. %, from 70 mol. % to 75 mol. %, from 75 mol. % to 85 mol. %, from 75 mol. % to 80 mol. %, or from 80 mol. % to 85 mol. % species comprising one or more gondoic acid moieties. In embodiments, the plant-based oil may comprise or consist essentially of jojoba oil. Jojoba oil is the oil extracted from the seeds of the jojoba plant (*Simmondsia chinensis*) and is comprised almost entirely of (that is, about 97%) mono-esters of long-chain fatty acids, such as mono-esters of gondoic acid and alcohols. Accordingly, the jojoba oil may comprise from 65 mol. % to 85 mol. % species comprising one or more gondoic acid moieties. For example, the jojoba oil may comprise from 65 mol. % to 80 mol. %, from 65 mol. % to 75 mol. %, from 65 mol. % to 70 mol. %, from 70 mol. % to 85 mol. %, from 70 mol. % to 80 mol. %, from 70 mol. % to 75 mol. %, from 75 mol. % to 85 mol. %, from 75 mol. % to 80 mol. %, or from 80 mol. % to 85 mol. % one or more species comprising gondoic acid moieties.

The plant-based oil may be operable to form a solution when mixed with the sulfonate surfactant. As sulfonate surfactants are generally insoluble in aqueous base fluids having a total dissolved concentration from 30,000 ppm, precipitate will form in such treatment fluids if the sulfonate surfactants are exposed to the aqueous base fluid. These precipitates may reduce the effectiveness of the treatment fluid and increase the interfacial tension between the treatment fluid and subterranean hydrocarbons. However, when kept in solution with the plant-based oil, which is stabilized within the aqueous base fluid by the zwitterionic co-surfactant, such precipitate is avoided.

The surfactant composition of the present disclosure may comprise the plant-based oil in an amount sufficient to maintain the sulfonate surfactant in solution. The surfactant composition of the present disclosure may comprise a plant-based oil in an amount of from 0.01 wt. % to 2 wt. %, based on the total weight of the treatment fluid. For example, the surfactant composition may comprise a plant-based oil in an amount of from 0.01 wt. % to 1.5 wt. %, from 0.01 wt. % to 1 wt. %, from 0.01 wt. % to 0.5 wt. %, from 0.01 wt. % to 0.1 wt. %, from 0.01 wt. % to 0.05 wt. %, from 0.05 wt. % to 2 wt. %, from 0.05 wt. % to 1.5 wt. %, from 0.05 wt. % to 1 wt. %, from 0.05 wt. % to 0.5 wt. %, from 0.05 wt. % to 0.1 wt. %, from 0.1 wt. % to 2 wt. %, from 0.1 wt. % to 1.5 wt. %, from 0.1 wt. % to 1 wt. %, from 0.1 wt. % to 0.5 wt. %, from 0.5 wt. % to 2 wt. %, from 0.5 wt. % to 1.5 wt. %, from 0.5 wt. % to 1 wt. %, from 1 wt. % to 2 wt. %, from 1 wt. % to 1.5 wt. %, or from 1.5 wt. % to 2 wt. %, based on the total weight of the treatment fluid. When the surfactant composition comprises the plant-based oil in an amount less than 0.01 wt. % based on the total weight of the treatment fluid, the amount of the plant-based oil may be insufficient to form a solution with the sulfonate surfactant. As a result, the amount of Nano-droplets formed by the surfactant composition may be reduced and the resulting interfacial tension between the aqueous base fluid and hydrocarbons may increase.

As mentioned previously, the surfactant composition may comprise a zwitterionic co-surfactant. As used in the present disclosure, the term "zwitterionic" refers to molecules comprising at least one anionic functional group and at least one cationic functional group, while also having a net charge of zero. The zwitterionic co-surfactant may comprise cocamidopropyl hydroxysultaine, betaines, such as cocamidopropyl betaine, or combinations of these. The zwitterionic co-surfactant may be operable to stabilize the nanosurfactant composition within the aqueous base fluid. In particular, the zwitterionic co-surfactant may adsorb at the interface between the surfactant composition and the aqueous base fluid, decreasing the interfacial tension between the two phases and facilitating the formation of nanoemulsion droplets. Additionally, the zwitterionic co-surfactant may disturb the organization of the sulfonate surfactant at the interface between subterranean hydrocarbons and the treatment fluid, which prevents the formation of liquid-crystal phases and further decreases the interfacial tension between the treatment fluid and the subterranean hydrocarbons.

The surfactant composition may comprise the zwitterionic co-surfactant in an amount sufficient to stabilize the surfactant composition within the aqueous base fluid, decrease the interfacial tension between the treatment fluid and the subterranean hydrocarbons, or both. The surfactant composition may comprise a zwitterionic co-surfactant in an amount of from 0.01 wt. % to 2 wt. %, based on the total weight of the treatment fluid. For example, the surfactant composition may comprise a zwitterionic co-surfactant in an amount of from 0.01 wt. % to 1.5 wt. %, from 0.01 wt. % to 1 wt. %, from 0.01 wt. % to 0.5 wt. %, from 0.01 wt. % to 0.1 wt. %, from 0.01 wt. % to 0.05 wt. %, from 0.05 wt. % to 2 wt. %, from 0.05 wt. % to 1.5 wt. %, from 0.05 wt. % to 1 wt. %, from 0.05 wt. % to 0.5 wt. %, from 0.05 wt. % to 0.1 wt. %, from 0.1 wt. % to 2 wt. %, from 0.1 wt. % to 1.5 wt. %, from 0.1 wt. % to 1 wt. %, from 0.1 wt. % to 0.5 wt. %, from 0.5 wt. % to 2 wt. %, from 0.5 wt. % to 1.5 wt. %, from 0.5 wt. % to 1 wt. %, from 1 wt. % to 2 wt. %, from 1 wt. % to 1.5 wt. %, or from 1.5 wt. % to 2 wt. %, based on the total weight of the treatment fluid. When the surfactant composition comprises the zwitterionic co-surfactant in an amount less than 0.01 wt % based on the total weight of the treatment fluid, the solution of the sulfonate surfactant and the plant-based oil may not be stabilized within the aqueous base fluid and, as a result the Nano-droplets of the surfactant composition may not form.

In embodiments, the surfactant composition may comprise the sulfonate surfactant and the zwitterionic co-surfactant in an amount of from 0.02 wt. % to 4 wt. % based on the total weight of the treatment fluid. For example, the surfactant composition may comprise the sulfonate surfactant and the zwitterionic co-surfactant in an amount of from 0.02 wt. % to 3 wt. %, from 0.02 wt. % to 2 wt. %, from 0.02 wt. % to 1 wt. %, from 0.02 wt. % to 0.2 wt. %, from 0.02 wt. % to 0.1 wt. %, from 0.1 wt. % to 4 wt. %, from 0.1 wt. % to 3 wt. %, from 0.1 wt. % to 2 wt. %, from 0.1 wt. % to 1 wt. %, from 0.1 wt. % to 0.2 wt. %, from 0.2 wt. % to 4 wt. %, from 0.2 wt. % to 3 wt. %, from 0.2 wt. % to 2 wt. %, from 0.2 wt. % to 1 wt. %, from 1 wt. % to 4 wt. %, from 1 wt. % to 3 wt. %, from 1 wt. % to 2 wt. %, from 2 wt. % to 4 wt. %, from 2 wt. % to 3 wt. %, or from 3 wt. % to 4 wt. %, based on the total weight of the treatment fluid. In embodiments, the surfactant composition may comprise the sulfonate surfactant and the zwitterionic co-surfactant in a weight ratio of from 0.3 to 3. For example, the surfactant composition may comprise the sulfonate surfactant and the zwitterionic co-surfactant in a weight ratio of from 0.3 to 2.7, from 0.3 to 2.4, from 0.3 to 2.1, from 0.3 to 1.8, from 0.3 to 1.5, from 0.3 to 1.2, from 0.3 to 0.9, from 0.3 to 0.6, from 0.6 to 3, from 0.6 to 2.7, from 0.6 to 2.4, from 0.6 to 2.1, from 0.6 to 1.8, from 0.6 to 1.5, from 0.6 to 1.2, from 0.6 to 0.9, from 0.9 to 3, from 0.9 to 2.7, from 0.9 to 2.4, from 0.9 to 2.1, from 0.9 to 1.8, from 0.9 to 1.5, from 0.9 to 1.2, from 1.2 to 3, from 1.2 to 2.7, from 1.2 to 2.4, from 1.2 to 2.1, from 1.2 to 1.8, from 1.8 to 3, from 1.8 to 2.7, from 1.8 to 2.4, from 1.8 to 2.1, from 2.1 to 3, from 2.1 to 2.7, from 2.1 to 2.4, from 2.4 to 3, from 2.4 to 2.7, or from 2.7 to 3.

The treatment fluids of the present disclosure may be utilized to recover hydrocarbons from a subterranean formation. Accordingly, in embodiments, the treatment fluid may be introduced into a well in fluid communication with the subterranean formation. In some embodiments, the treatment fluid may be introduced into a production well in fluid communication with the subterranean formation. In some embodiments, the treatment fluid may be introduced into an injection well in fluid communication with the subterranean formation. In some embodiments, the treatment fluid may be injected using the production tubing of the wellbore and, in some embodiments, the treatment fluid may be injected using a coiled tubing.

In some embodiments, the injection of the treatment fluid into the subterranean formation may include pumping a displacement fluid, also referred to as a flush fluid, into the wellbore after the treatment fluid. The displacement fluid may drive the treatment fluid from the wellbore and through the subterranean formation. The displacement fluid may be pumped into the wellbore until all, or nearly all, of the treatment fluid has been forced into the subterranean formation. In some embodiments, the treatment fluid may be incompatible with fluids already present within the wellbore, such as a drilling fluid. In such embodiments, a spacer fluid may be pumped into the wellbore prior to the injection of the treatment fluid. The spacer fluid may provide separation between a fluid already present within the wellbore and the treatment fluid. Once injected into the subterranean formation, the treatment fluid may displace hydrocarbons from the subterranean formation and into one or more production wells in fluid communication with the subterranean formation.

EXAMPLES

The various embodiments of the treatment fluids and the methods for recovering hydrocarbons from subterranean formations of the present disclosure will be further clarified by the following examples. The examples are illustrative in nature, and should not be understood to limit the subject matter of the present disclosure.

Example 1

As mentioned previously the surfactant composition of the present disclosure may be extremely stable, particularly at elevated temperatures (that is, at least 75° C.) for extended periods of time and in aqueous base fluid having an elevated salinity. Accordingly, the stability of the surfactant composition was tested in synthetic seawater at 90° C. for 4 weeks.

A treatment fluid was prepared by first removing the mineral oil, which was approximately 35 wt. %, from a sulfonate surfactant solution (commercially available as PETRONATE® HL/L from Sonneborn). The mineral oil was then replaced by filtered jojoba oil. A 5% stock solution of the modified sulfonate surfactant was then prepared by mixing 50 grams (g) of the modified sulfonate surfactant solution with 1000 milliliters (mL) of deionized water. A 4% stock solution of the zwitterionic co-surfactant was also prepared by mixing 40 g of the zwitterionic co-surfactant (commercially available as COLA® TERIC CBS-HP from Colonial Chemical) with 1000 mL of deionized water. Next, 100 mL of the 5% stock solution of the modified sulfonate surfactant and 125 mL of the 4% stock solution of the zwitterionic co-surfactant were mixed with 1000 mL of synthetic seawater comprising 41.04 g sodium chloride (NaCl), 2.384 g calcium chloride dehydrate ($CaCl_2.2H_2O$), 17.645 g magnesium chloride hexahydrate ($MgCl_2.6H_2O$), 6.343 g sodium sulfate ($Na_2SO_4$), and 0.165 g sodium bicarbonate ($NaHCO_3$).

Samples of the treatment fluid were placed in cylindrical pressure tubes, which were sealed and incubated in an oven at 90° C. The stability of the samples was checked and photographed after 1 day, 9 days, 16 days, and 28 days. The photographs showed that, after 1 day, the samples remained stable. After 9 days, minor amounts of cloudy agglomeration formed in the samples; however, it is believed that such minor amounts would not affect performance. After 16 days, some additional cloudy agglomeration had formed, but was easily dispersed upon filtration of the samples. After 28 days, some additional cloudy agglomeration as well as minor amounts of precipitates had formed, but these were easily dispersed upon minor agitation of the samples.

Example 2

As mentioned previously, the reduction of the interfacial tension between hydrocarbons and enhanced oil recovery treatment materials generally results in increased hydrocarbon recovery. Accordingly, the interfacial tension between hydrocarbons and the treatment fluid of the present disclosure was measured using a spinning drop interfacial tensiometer (commercially available as M6500 from Grace Instrument).

A treatment fluid was prepared in the same manner as described in Example 1. A capillary tube was filled with the treatment fluid and a droplet of filtered crude oil, which was then spun at 4000 revolutions per minute (rpm) at 90 degrees ° C. The diameter of the filtered crude oil droplet was recorded every 5 minutes for 30 minutes, which was then used to calculate the interfacial tension between the treatment fluid and the filter crude oil according to Equation (I):

$$IFT = 2.78 \times 10^{-16} \frac{\pi^2}{8n^3}(\rho_a - \rho_o)\omega D^3 \quad \text{Equation (I)}$$

IFT=Interfacial Tension in Millinewtons per Meter (mN/m);
n=Refractive Index of the Treatment Fluid;
$\rho_a$=Density of the Treatment Fluid in Grams per Cubic Centimeter (g/cm³);
$\rho_o$=Density of the Filtered Crude Oil in g/cm³;
ω=Rotation Speed in rpm; and
D=Diameter of the Filtered Crude Oil Droplet.

This procedure was repeated once. The average interfacial tension over the course of 30 minutes for the two runs was determined to be 0.00018 mN/m and 0.0023 mN/m, respectively.

This indicates that the surfactant composition is capable of achieving a minimal interfacial tension between the treatment fluid and hydrocarbons. Additionally, this indicates that the surfactant composition is operable at increased temperatures (that is, at least 90° C.) and in treatment fluids comprising brine as the aqueous base fluid (that is, an aqueous base fluid with having a total dissolved solids concentration greater than 50,000 ppm).

It will be apparent to those skilled in the art that various modifications and variations can be made without departing from the spirit or scope of the disclosure. Since modifications, combinations, sub-combinations, and variations of the disclosed embodiments incorporating the spirit and substance of the disclosure may occur to persons skilled in the art, the scope of the disclosure should be construed to include everything within the scope of the appended claims and their equivalents.

In a first aspect of the present disclosure, a treatment fluid may comprise an aqueous base fluid and a surfactant composition. The surfactant composition may comprise a sulfonate surfactant in an amount of from 0.01 wt. % to 2 wt. % based on the total weight of the treatment fluid composition, a plant-based oil in an amount of from 0.01 wt. % to 2 wt. % based on the total weight of the treatment fluid composition, and a zwitterionic co-surfactant in an amount of from 0.01 wt. % to 2 wt. % based on the total weight of the treatment fluid composition. The plant-based oil may comprise from 65 mol. % to 85 mol. % species comprising gondoic acid moieties.

A second aspect of the present disclosure may comprise the first aspect, wherein the treatment fluid is positioned in a subterranean formation comprising hydrocarbons.

A third aspect of the present disclosure may comprise the second aspect, wherein the interfacial tension between the treatment fluid and the hydrocarbons is less than or equal to 0.003 mN/m.

In a fourth aspect of the present disclosure, a method of recovering hydrocarbons from a subterranean formation may comprise introducing a treatment fluid into an injection well in fluid communication with the subterranean formation and driving the treatment fluid through the subterranean formation such that the hydrocarbons are displaced from the subterranean formation to a production well in fluid communication with the subterranean formation. The treatment fluid may comprise an aqueous base fluid and a surfactant composition. The surfactant composition may comprise a sulfonate surfactant in an amount of from 0.01 wt. % to 2 wt. % based on the total weight of the treatment fluid composition, a plant-based oil in an amount of from 0.01 wt. % to 2 wt. % based on the total weight of the treatment fluid composition, and a zwitterionic co-surfactant in an amount of from 0.01 wt. % to 2 wt. % based on the total weight of the treatment fluid composition. The plant-based oil may comprise from 65 mol. % to 85 mol. % species comprising one or more gondoic acid moieties.

A fifth aspect of the present disclosure may comprise the fourth aspect, wherein the interfacial tension between the treatment fluid and the hydrocarbons is less than or equal to 0.003 mN/m.

A sixth aspect of the present disclosure may comprise either the fourth or fifth aspects, further comprising pumping a displacement fluid into the injection well after the treatment fluid.

A seventh aspect of the present disclosure may comprise any of the preceding aspects, wherein the aqueous base fluid has a total dissolved solids concentration greater than or equal to 30,000 ppm.

An eighth aspect of the present disclosure may comprise any of the preceding aspects, wherein the treatment fluid comprises the aqueous base fluid in an amount of from 90 wt. % to 99 wt. % based on the total weight of the treatment fluid.

A ninth aspect of the present disclosure may comprise any of the preceding aspects, wherein the treatment fluid is an emulsion comprising the surfactant composition dispersed within the aqueous base fluid.

A tenth aspect of the present disclosure may comprise the ninth aspect, wherein the treatment fluid comprises Nanodroplets comprising the surfactant composition, the Nanodroplets having a diameter of from 10 nm to 100 nm.

An eleventh aspect of the present disclosure may comprise any of the preceding aspects, wherein the sulfonate surfactant comprises a petroleum sulfonate surfactant.

A twelfth aspect of the present disclosure may comprise any of the preceding aspects, wherein the plant-based oil comprises jojoba oil.

A thirteenth aspect of the present disclosure may comprise any of the preceding aspects, wherein the zwitterionic co-surfactant comprises cocamidopropyl hydroxysultaine, cocamidopropyl betaine, or both.

It should now be understood that various aspects of the treatment fluids and methods of recovering hydrocarbons from a subterranean formation are described and such aspects may be utilized in conjunction with various other aspects.

It should be understood that any two quantitative values assigned to a property may constitute a range of that property, and all combinations of ranges formed from all stated quantitative values of a given property are contemplated in this disclosure.

Having described the subject matter of the present disclosure in detail and by reference to specific embodiments, it is noted that the various details described in this disclosure should not be taken to imply that these details relate to elements that are essential components of the various embodiments described in this disclosure. Rather, the appended claims should be taken as the sole representation of the breadth of the present disclosure and the corresponding scope of the various embodiments described in this disclosure. Further, it will be apparent that modifications and variations are possible without departing from the scope of the appended claims.

What is claimed is:

1. A treatment fluid comprising:
an aqueous base fluid; and
a surfactant composition comprising:
a sulfonate surfactant in an amount of from 0.01 wt. % to 2 wt. % based on the total weight of the treatment fluid composition;
a plant-based oil in an amount of from 0.01 wt. % to 2 wt. % based on the total weight of the treatment fluid composition, the plant-based oil comprising from 65 mol. % to 85 mol. % species comprising one or more gondoic acid moieties, wherein the plant-based oil comprises jojoba oil; and
a zwitterionic co-surfactant in an amount of from 0.01 wt. % to 2 wt. % based on the total weight of the treatment fluid composition.

2. The treatment fluid of claim 1, wherein the aqueous base fluid has a total dissolved solids concentration greater than or equal to 30,000 ppm.

3. The treatment fluid of claim 1, wherein the treatment fluid comprises the aqueous base fluid in an amount of from 90 wt. % to 99 wt. % based on the total weight of the treatment fluid.

4. The treatment fluid of claim 1, wherein the treatment fluid is an emulsion comprising the surfactant composition dispersed within the aqueous base fluid.

5. The treatment fluid of claim 4, wherein the treatment fluid comprises droplets comprising the surfactant composition, the droplets having a diameter of from 10 nm to 100 nm.

6. The treatment fluid of claim 1, wherein the sulfonate surfactant comprises a petroleum sulfonate surfactant.

7. The treatment fluid of claim 1, wherein the zwitterionic co-surfactant comprises cocamidopropyl hydroxysultaine, cocamidopropyl betaine, or both.

8. The treatment fluid of claim 1, wherein the treatment fluid is positioned in a subterranean formation comprising hydrocarbons.

9. The treatment fluid of claim 8, wherein the interfacial tension between the treatment fluid and the hydrocarbons is less than or equal to 0.003 mN/m.

10. A method for recovering hydrocarbons from a subterranean formation, the method comprising:
introducing a treatment fluid into an injection well in fluid communication with the subterranean formation, the treatment fluid comprising:
an aqueous base fluid; and
a surfactant composition comprising:
a sulfonate surfactant in an amount of from 0.01 wt. % to 2 wt. % based on the total weight of the treatment fluid composition;
a plant-based oil in an amount of from 0.01 wt. % to 2 wt. % based on the total weight of the treatment fluid composition, the plant-based oil comprising from 65 mol. % to 85 mol. % species comprising one or more gondoic acid moieties, wherein the plant-based oil comprises jojoba oil; and
a zwitterionic co-surfactant in an amount of from 0.01 wt. % to 2 wt. % based on the total weight of the treatment fluid composition; and
driving the treatment fluid through the subterranean formation such that the hydrocarbons are displaced from the subterranean formation to a production well in fluid communication with the subterranean formation.

11. The method of claim 10, wherein the aqueous base fluid has a total dissolved solids concentration greater than or equal to 30,000 ppm.

12. The method of claim 10, wherein the treatment fluid comprises the aqueous base fluid in an amount of from 90 wt. % to 99 wt. % based on the total weight of the treatment fluid.

13. The method of claim 10, wherein the treatment fluid is an emulsion comprising the surfactant composition dispersed within the aqueous base fluid.

14. The method of claim 13, wherein the treatment fluid comprises droplets comprising the surfactant composition, the droplets having a diameter of from 10 nm to 100 nm.

15. The method of claim 10, wherein the sulfonate surfactant comprises a petroleum sulfonate surfactant.

16. The method of claim 10, wherein the zwitterionic co-surfactant comprises cocamidopropyl hydroxysultaine, cocamidopropyl betaine, or both.

17. The method of claim 10, wherein the interfacial tension between the treatment fluid and the hydrocarbons is less than or equal to 0.003 mN/m.

18. The method of claim 10, further comprising pumping a displacement fluid into the injection well after the treatment fluid.

* * * * *